United States Patent [19]

Vasilantone

[11] 3,973,446
[45] Aug. 10, 1976

[54] WEB ALIGNER
[76] Inventor: Michael Vasilantone, 34 Columbia Road, Branchburg Township, Somerville, N.J. 08876
[22] Filed: Nov. 27, 1974
[21] Appl. No.: 527,911

Related U.S. Application Data
[63] Continuation-in-part of Ser. No. 407,162, Oct. 17, 1973, abandoned.

[52] U.S. Cl. .............................. 74/241; 198/202; 226/21; 242/57.1; 26/99
[51] Int. Cl.² .................. F16H 7/18; B65G 15/62; B65H 25/26; D02J 3/14
[58] Field of Search ............. 74/241; 198/202, 137; 226/15, 18, 21, 23; 242/57.1, 76; 26/66

[56]        References Cited
          UNITED STATES PATENTS
1,432,832  10/1922  Brockett .................... 74/241
1,963,099   6/1934  Robins ...................... 74/241
2,008,318   7/1935  Ziegles ..................... 74/241
2,451,394  10/1948  Klein ....................... 198/202
3,069,056  12/1962  Richards et al. ............. 242/57.1
3,368,665   2/1968  Jinkins ..................... 226/23

Primary Examiner—Samuel Scott
Assistant Examiner—A. Russell Burke
Attorney, Agent, or Firm—Edward E. Dyson; John J. Byrne

[57]              ABSTRACT

A device for maintaining a predetermined alignment of a running web and more particularly maintaining the alignment of the belt of an endless conveyor comprising an idler spool over which the web or belt passes and which is laterally movable relative to its supporting framework. Means are provided for lifting one end of the idler spool and lowering the other in response to the lateral shifting of the belt and spool from a predetermined aligned position to cause the spool and the belt to again seek the predetermined aligned position.

14 Claims, 12 Drawing Figures

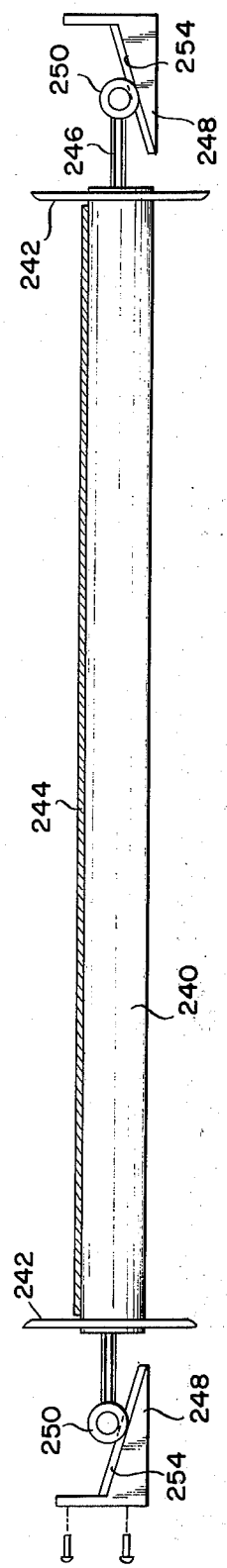
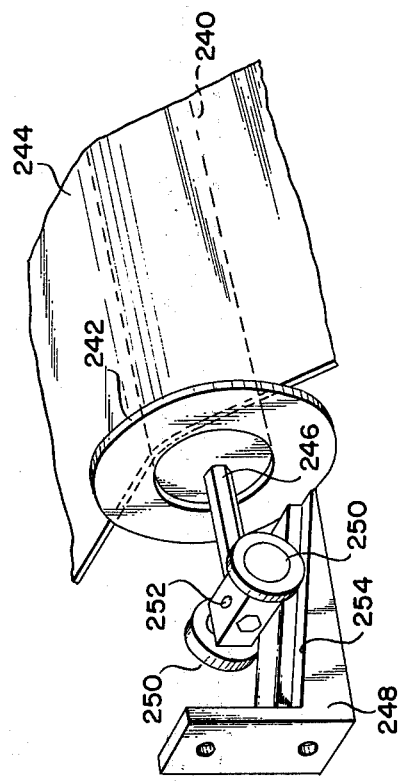

WEB ALIGNER

BACKGROUND AND FIELD OF THE INVENTION

This is a continuation-in-part application of my copending application Ser. No. 407,162, filed Oct. 17, 1973, entitled WEB ALIGNER.

This invention relates to devices for maintaining the alignment of a running web and more particularly for maintaining the alignment of an endless belt conveyor, and the invention will be described in this specification in the context of the latter embodiment.

The purpose of this invention is to provide a device which will maintain a web or belt such as that of an endless belt conveyor, for example, in a predetermined aligned position relative to the drive and idler pulleys about which it is played. Belts, particularly those that are run at high speeds, have a tendency to run off the ends of the pulleys to the damage of the belt and to the damage and perhaps destruction of the articles carried by the belt. Often a belt is damaged beyond repair when it is only slightly out of alignment through abrasion and frictional contact with the side edges of the pulleys or idler rollers over which it travels. Assuming that the operator detects the misalignment in sufficient time to prevent damage to the belt, the unit oftentimes has to be shut down until the belt is again properly realigned. Of course, there have been many attempts in the prior art to provide means for automatically detecting and/or correcting any misalignment. The detector devices usually sense the side edges of the belt and when they vary from a predetermined norm, the detector trips an alarm circuit of some type and perhaps an automatic shutdown circuit, not to be activated again until the misalignment is corrected. Those devices that provide not only for detection of the misalignment but for correction thereof usually take the form of rather complicated power-operated devices, either pneumatically or electrically operated, which correct the misalignment once detected.

While some of the prior art devices described above are directed toward the same problem and provide substantially the same purpose as the device of the subject invention, the previously employed apparatus is usually far more complicated and more expensive to construct, install, operate and maintain than is the simplistic, compact, reliable, mechanical device of the invention of this application.

It is an object of this invention to provide an aligner device for running webs including endless conveyor belts or the like which is simple and inexpensive to construct and reliable in operation.

It is a further objective of this invention to provide an aligner device for running webs for endless conveyor belts or the like which are fully adaptable to lifting existing conveyor mechanisms with a minimum of modification upon installation.

It is a further objective of this invention to provide an aligner device for webs for endless conveyor belts or the like which is useful for belts or webs of any particular texture and does not depend upon the rigidity of the belt for its success in operation.

It is a further objective of this invention to provide an aligner device for running webs, conveyor belts or the like which instaneously and automatically senses and corrects a misalignment by raising one end of a slidable idler spool over which the belt or web is positioned while dropping the other end causing the spool to shift back to the predetermined aligned position.

SUMMARY OF THE INVENTION

The aligner device of this invention includes an idler spool over which the web or belt to be aligned is positioned. Briefly, the idler spool moves laterally with the web or belt when the latter moves out of alignment. The lateral movement of the idler is detected by mechanisms which tilt the idler causing it to slide back to its central or aligned position. More particularly, in a preferred embodiment, the idler is in the form of a spool having a central cylindrical portion and end plates in the form of discs attached at each end of the cylindrical portion. The idler is rotatably and slidably mounted on a shaft which in turn is supported at each end by a lifter which is suitably mounted on the conveyor framework. Each of the lifters comprises a housing, and a ramp pivotally mounted intermediate its length on a horizontal axis within said housing. The ramp includes an upper portion and a lower portion with the shaft ends resting on dished out bearing pads which are mounted on the lower ends of said ramps. A reciprocating sensor is slidably mounted in a bearing which is affixed to the top portion of the housing of each lifter with the sensor including a horizontally disposed rod extending in a direction parallel to the axis of the shaft and slidably received in the aforementioned bearing. One end of the rod is provided with a wheel rotatably mounted on a generally vertically disposed axis and engaging the outer surface of the disc or end plate on one end of the idler spool. The other end of the rod is provided with a pair of wheels journaled on a horizontal axis extending transversely to the axis of the rod and riding on the upper portion of the pivotally mounted ramp above its axis. The bottom portion of the ramp is provided with a generally horizontally extending portion to which is affixed the bearing pad mentioned above which in turn supports an end of the shaft upon which the idler spool is rotatably mounted. When the belt or web shifts laterally from a predetermined aligned position it engages the inner surface of one of the discs forming the spool ends and causes the spool to likewise shift laterally on its shaft. When the spool shifts laterally, the sensor shifts laterally and forces the ramp to pivot such that the lower end is raised, thereby raising the shaft end it supports.

In order to reduce the amount of force required to tilt the ramp and, therefore, lift the shaft end, a pair of springs are attached to the upper portion of the ramp and extend downwardly to a spring tension adjustor. The tension on the springs is set such that the ramp is delicately balanced at a predetermined position to hold the shaft and, therefore, the idler roller in a predetermined horizontal orientation. By so balancing the ramp, relatively slight force emanating from the lateral shifting of the web and the idler spool will be sufficient from the sensor to tilt the upper portion of the ramp downwardly to thereby lift the lower portion and the idler roller shaft end supported thereon. Through the use of a spring balancer or tensioner, the aligner mechanism is sensitive to misalignments of belts of relatively lightweight texture. In other words, the force required to shift the idler roll and the sensing mechanism is not such that a relatively rigid belt is required.

Alternative embodiments for tilting the idler roll in response to lateral misalignment of the conveyor web or belt are disclosed herein. In one such embodiment, the idler roll comprises a hollow tube which is supported by inwardly directed rotatable cone-shaped elements. As the idler roll rotates, the peripheral edges of the ends of the idler roll rest on the inclined surfaces of the rotatable cones. The idler roll is caused to shift laterally because of lateral misalignment of the web or belt, and will move on the inclined surfaces of the cones, whereby one end of the idler is raised and the other is lowered. This will cause the web to move back to its aligned position as described earlier herein.

Another alternative embodiment disclosed herein includes a downwardly aligned ramp on each end of a flanged idler roll. A set of wheels are journaled in axial extensions extending from each end of the idler roll and ride on the inclined ramps. The idler roll is supported by the wheels journaled on the axle extensions with the wheels in turn riding on the surfaces of the inclined ramps. Lateral movement of the idler roll, as a result of web misalignment, causes one end of the roll to move up its supporting ramp and the other end to move down its supporting ramp thereby the idler roll is tilted. In a further embodiment, the idler roll is suspended by hanger straps or links which effect a tilting of the idler roll when the latter is shifted in a lateral direction.

These and other objects of the invention will become more apparent to those skilled in the art by reference to the following detailed descriptions when viewed in light of the accompanying drawings, wherein:

FIG. 11 is a view in elevation of another embodiment of the web aligner of this invention; and FIG. 12 is a perspective view illustrating one end of the embodiment of FIG. 11.

DETAILED DESCRIPTION OF THE INVENTION

The aligner device of this invention will be described with relation to maintaining a predetermined alignment of the belt of an endless belt conveyor but it is to be understood that the invention is just as effective and performs the same function with any type of running web such as fabric being fed from a supply to a takeup reel and is not limited to use with an endless belt conveyor.

Figure 1:
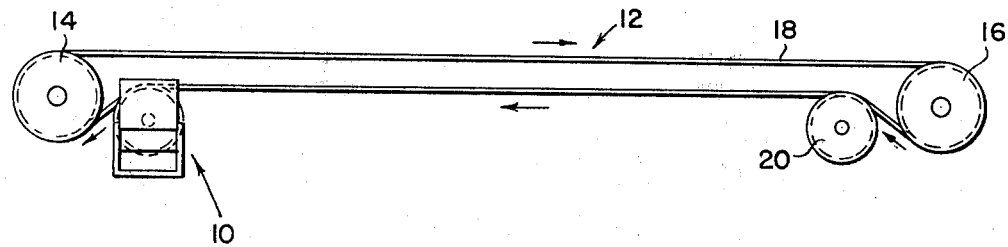
FIG. 1 is a side view in elevation showing the placement of the aligner device of this invention on an endless belt conveyor.

Referring now to FIG. 1, the aligner of this invention is generally indicated by the numeral 10 and is shown in use in an endless belt conveyor 12. The conveyor 12 is provided with a head pulley 14 and a rear pulley 16 one of which is driven and over which a belt 18 is positioned. An idler roll 20 is placed below the rear pulley 16 and guides the lower run of the conveyor belt toward the head pulley. The aligner 10 is substituted for an idler roll that would normally be positioned adjacent and below the head pulley 14. As mentioned earlier in this specification, the aligner is readily adaptable to existing conveyors or running web systems with a minimum of modification and restructuring and, in fact, all that is necessary is the provision of adequate support means for the aligner mechanism which normally can be provided by the conveyor framework. It is to be understood that support means, not forming part of this invention, for the mechanism to be described below is provided, though, for purposes of clarity, it is omitted from the drawing. The support means can take the form of the conveyor framework which journals the pulleys 14 and 16 and the idler roller 20 or it can be separate standards which engage the floor and properly position and support the aligner relative to the belt 18. In order to effect accurate and reliable correction of web misalignments, it is important that the web aligner be in close parallel proximity to the head roll or pulley 14.

Figure 2:
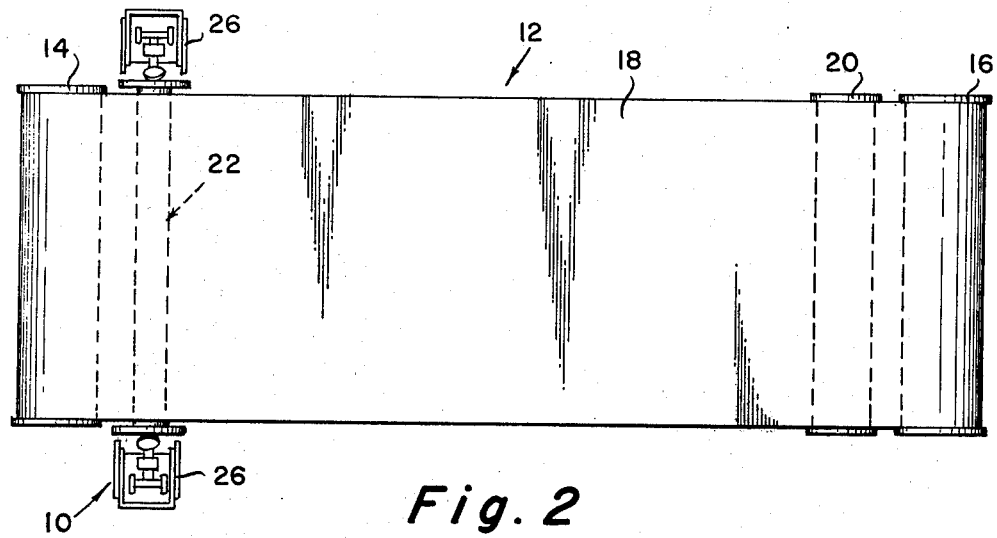
FIG. 2 is a plan view of the arrangement of FIG. 1.
Figure 3:
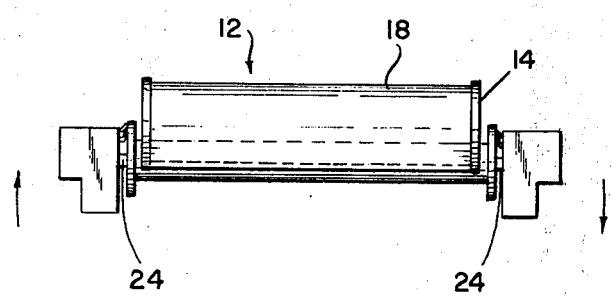
FIG. 3 is an end view of the arrangement of FIG. 1 taken from the left of FIG. 1.

The aligner of this invention, more clearly shown in FIGS. 2 and 3, includes an idler spool or roll 22 which is rotatably and slidably mounted on a shaft 24 which in turn is supported at each end by lifter units 26. The lifter units are identical and will be described in greater detail below. The lifter units alternately raise or lower the shaft ends which they support in unison to tilt the idler spool in response to a misalignment of the conveyor belt from a predetermined alignment. With reference to FIG. 3, if the conveyor belt slides out of alignment to the left, for example, it will also force the spool 22 to the left and, through a mechanical arrangement to be described below, cause the lifter unit 26 on the left to raise the shaft end which it supports while the lifter unit 26 on the right lowers the shaft end it supports thereby tilting the shaft and the idler spool about point C which is a horizontal axis extending transversely to the longitudinal axis of the shaft. This tilting will cause the idler spool to shift back to the right until the belt and pulley are back to their predetermined aligned position. The angle of tilt of the shaft, of course, will progressively decrease and eventually reach its horizontal disposition upon reaching the predetermined aligned position.

Figure 4:
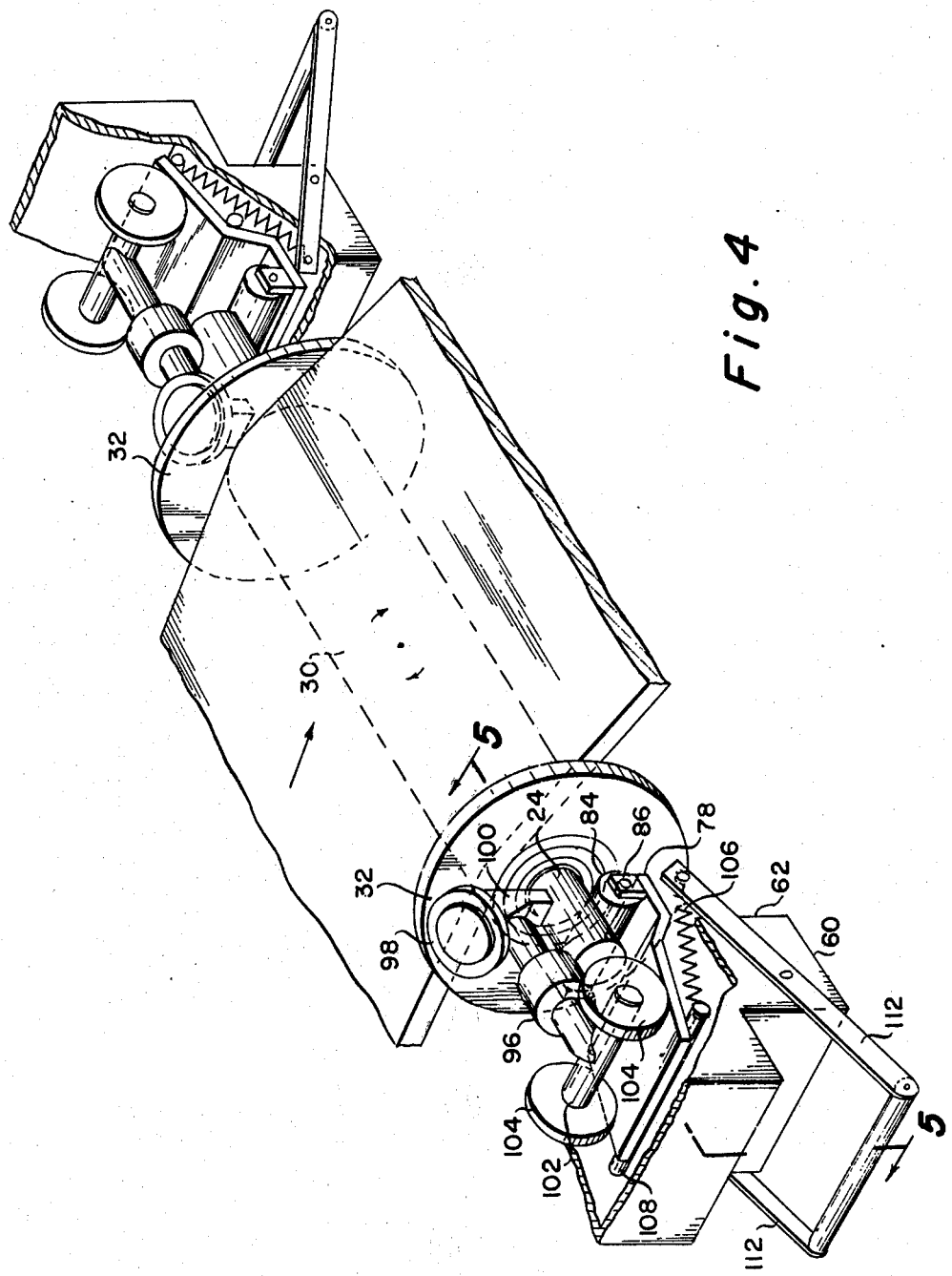
FIG. 4 is a perspective view of the aligner device of this invention.
Figure 5:
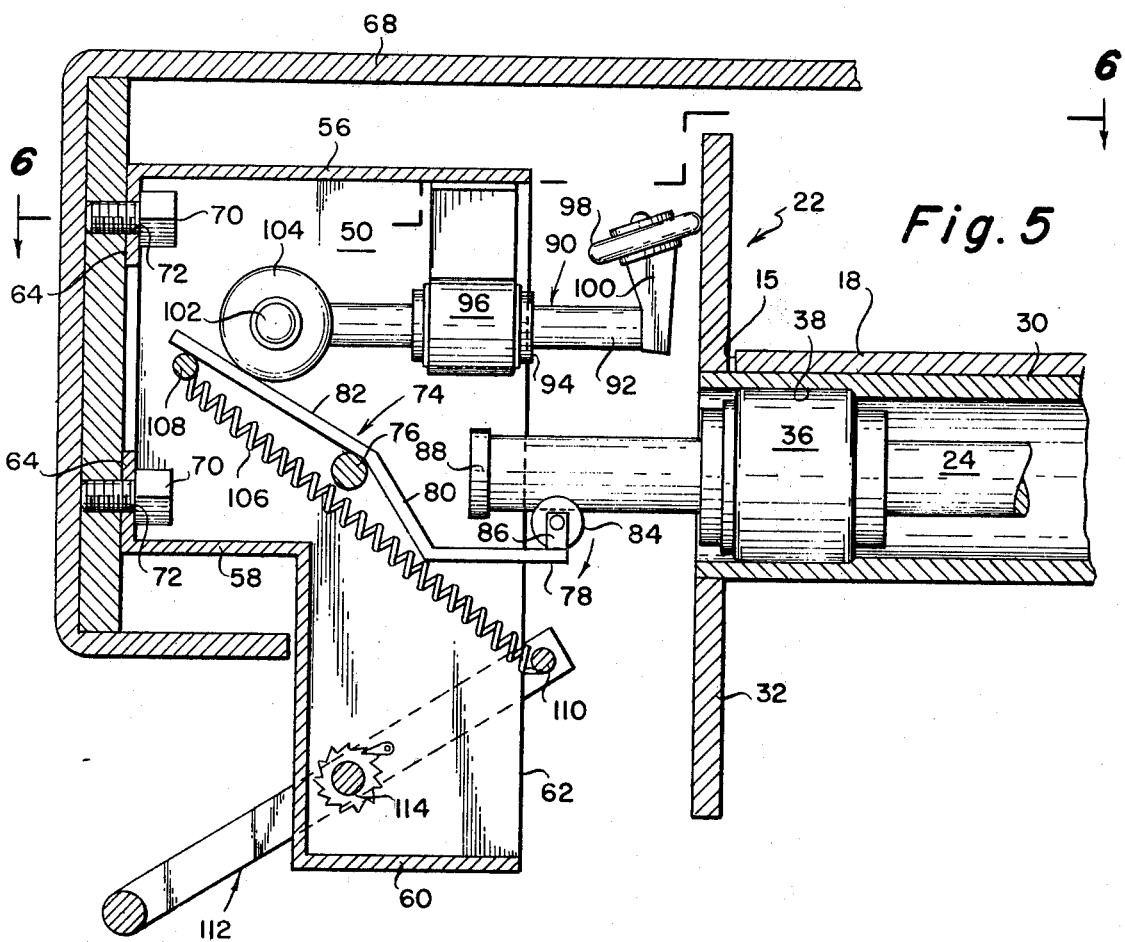
FIG. 5 is a side view in elevation of one of the lifting units of the aligner device of this invention.

Referring now to FIG. 4, the idler spool 22 consists of a cylindrical body portion 30 and a pair of discs or end plates 32 affixed to the ends of the cylindrical portion 30. The spacing between the inner surfaces of the end plate 22 is approximately equal to or just slightly greater than the width of the belt 18. Of course, it is to be understood that the aligner mechanism of this invention is operable with any width belt or web and the adaptation is made by merely substituting an idler spool corresponding to the width of the web or belt to which it is to be applied. With continued reference to FIG. 4 and with reference to FIGS. 5 and 6, the idler spool is journaled on a shaft 34 through bearing 36. Bearing 36 is firmly seated in undercut portion 38 of the cylinder 30 and is firmly affixed to the cylinder. The bearing can be of any suitable anti-friction type which permits relative rotation between the spool 22 and the shaft 34 and which also permits axial or lateral movement of the spool 22 relative to the shaft 34. It is to be understood that while only one bearing is shown in FIG. 5, the other end of the shaft includes an identical assembly. Further, each of the lifter units 26 are identical; therefore, statements made with regard to one unit will apply equally to the other unit.

The purpose of the lifter mechanisms is to simultaneously lift and lower opposite ends of the shaft 34 to cause the idler pulley to slide back to a predetermined position after it has been moved out of a predetermined alignment by the belt 18.

Each lifter unit has a housing 50 having side walls 52 and 54, a top wall 56 and stepped bottom walls 58 and 60. The housing is open at 62, the side facing the idler spool 22. The housing is provided with a rear wall 64 and is attached to a support frame 68 by means of threaded fasteners 70 which extend through openings 72 in the rear wall 64. The framework 68 extends across the conveyor belt as best seen in FIG. 5. The supporting framework 68 extends across the conveyor and supports the opposite side lifter and in turn is suitably supported by means not shown, preferably the framework for the conveyor mechanism itself. Alternately, the framework 68 can be mounted on feet or other ground-engaging support means.

Figure 6:
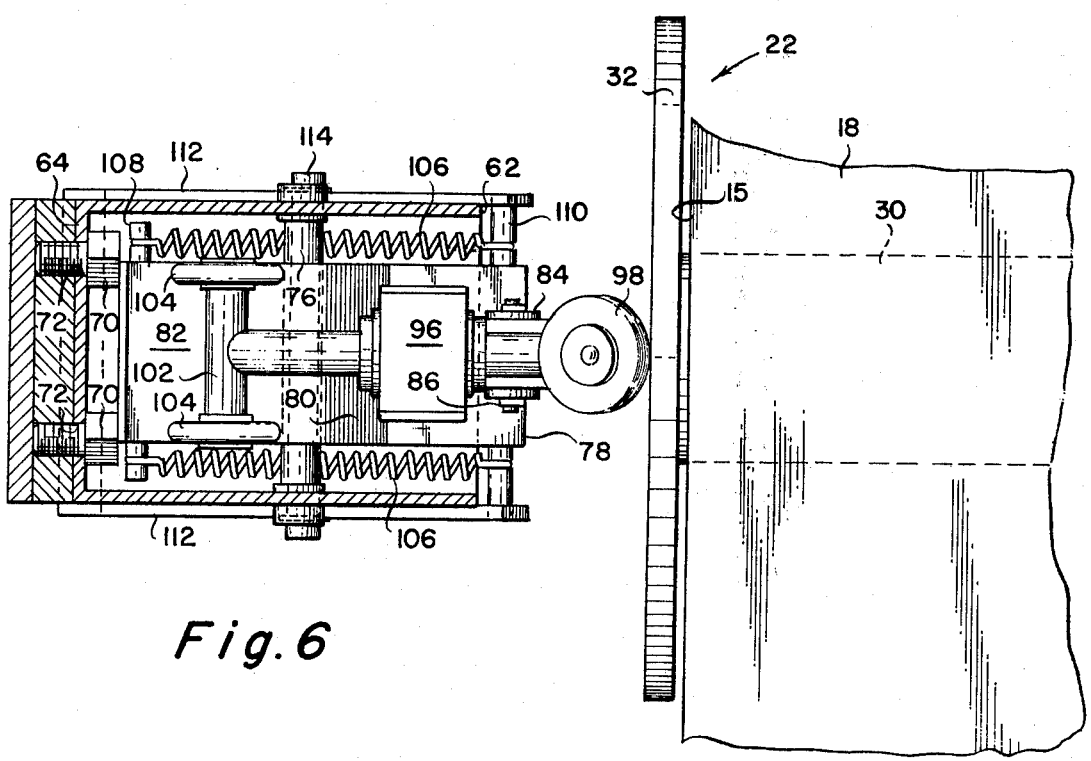
FIG. 6 is a plan view of the lifting unit of FIG. 5 with the top portion of the housing removed.

A ramp generally indicated by the numeral 74 is firmly affixed to a horizontally disposed rod 76 which is journaled in the side walls 52 and 54 of the housing 50 as best seen in FIG. 6. Spacing washers 78 are positioned on the shaft and inside of the side walls 52 and 54. The ramp 76 consists of a first horizontal portion which will hereinafter be referred to as the lower portion 78. A second or intermediate portion 80 forming an obtuse angle with the portion 78 and a third or upper portion 82 forming an angle greater than 180° with the intermediate portion 80. A shaft supporting bearing 84 is affixed to the lower portion 78 of the ramp 74 by means of brackets 86. The bearing 84 is in the form of a roller which tapers at each end to a reduced diameter central portion conforming generally to the curvilinear surface of the shaft 34. A circular flange 88 is provided on the outer end of the shaft 34 to prevent it from rolling off the bearing member.

A lateral movement sensor generally indicated by the numeral 90 extends between the outer surface of the disc or end plate 32 of the idler spool and the upper portion 82 of the ramp 74. The sensor includes a rod 92 having a longitudinal axis substantially parallel to the longitudinal axis of the shaft 34 and slidably received in a cylindrical bearing 94 which is supported by a bracket 96 suspended from and affixed to the top wall 56 of the housing 50. The outer end of the rod 92 is provided with a wheel 98 which is journaled on an axis slightly offset from the vertical. The axis extends through an extension 100 of the rod 92. The wheel 98 is provided with a suitable friction surface and engages the outer surface of the plate 32 and is rotated by the end plate 32 when the spool is driven by movement of the belt 18. The other end of the rod 92 or the inner end is provided with a transversely extending axle 102 and has wheels 104 similar to wheels 98 journaled to each end thereof. The wheels 104 normally engage and ride on the inclined upper portion 82 of the pivoted ramp 74.

A pair of tensioning springs 106 are attached to a spring retaining rod 108 which is affixed to and extends across the upper portion of the ramp 74. The springs extend downwardly and are fastened to a lower spring retaining rod 110 which is in turn fixed to and supported by the free side rams of the pivoted "U"-shaped lever 112. The lever 112 is pivotally mounted to a transversely extending rod 114 which is supported by and extends between the side walls 52 and 54 of the housing 50. By lifting upwardly on the lever 112, the tension on the springs 106 is increased tending to pivot the ramp 74 in a counterclockwise direction around the pivot rod 76 against the force exerted by the weight of the shaft end it supports.

In operation, the lever 112 is adjusted to apply tension to the spring 106 to maintain the ramp 74 in a balanced condition. The balanced condition being that in which the shaft 34 is parallel to the horizontal. In this position, the idler spool 22 and the belt thereon which is received between the end plates 32 is placed in proper alignment relative to the head and end pulleys and idler pulleys over which the belt travels. In this position, the entire assembly is in a balanced and aligned position. When the belt is driven, however, there is a tendency for the belt to move out of alignment to the damage of surrounding supporting equipment and to its own damage. When the belt moves out of its predetermined aligned position, its edge 15 thereof, assuming with reference to FIG. 5 that the belt is shifting to the left, will engage the inner surface of the disc 32 and will force the idler spool to move to the left. As will be recalled, the bearing 36 mounts the spool on the shaft 34 for both rotary and axial movement. Since the end plate 32 is in constant engagement with the wheel 98 of the sensor 90, as the spool moves to the left, rod 92 of the sensor is likewise pushed to the left forcing wheels 104, up the inclined upper portion 82 on the pivoted ramp 74. Since the rod 90 is limited to vertical movement only by the bracket 96 and the bearing 94, continued inward movement of the rod 92 and the wheels 104 which are journaled to the outer end thereof, will cause the ramp 74 to be pivoted in a counterclockwise direction raising the lower portion 78 thereof and likewise raising the end of the shaft 34 which is supported on the bearing 84. While this lifting function is taking place on the side toward which the belt is moving in the lateral directon, a lowering function or the exact opposite movement takes place on the opposite end of the shaft. This can be readily understood by again referring to FIG. 5. Assuming that the belt is shifting to the right, the spool will move away to the right and the sensor means 90 will follow since the shaft and spool exert a downward force on the lower portion 78 of ramp 74 tending to pivot it in a clockwise direction thereby pushing the sensor means to the right. The shaft end will continue to move downwardly as long as the rod 92 and sensor 90 continues to move to the right. These opposite and simultaneous lifting and lowering functions will tilt the shaft 34 about a horizontal axis extending transversely through the center of the longitudinal axis of shaft 34. This tilting movement will cause the idler spool 30 to slide back to the balanced and aligned position. In other words, if the belt moves laterally out of alignment to the left as explained earlier, the shaft end shown in FIG. 5 will be lifted while the opposite end will be lowered and the idler spool will tend to move toward the right back to the aligned position. Of course, as this corrective movement takes place, the end shown in FIG. 5 will be lowered and the other end will be raised both back to the balanced position.

The degree of force required to shift the idler spool and the sensing mechanism is not excessive due to the tensioning force applied to the ramp 74 by springs 106 balanced against the weight of the shaft ends. The handle 112 is positioned at a point where the ramp is delicately balanced against the weight of the shaft holding the shaft 34 in the horizontal position. The lever 112 is locked in the desired position by any suitable locking means. For purposes of illustration, a pawl and ratchet arrangement is schematically illustrated in FIG. 5 to perform the locking function.

Figure 7:
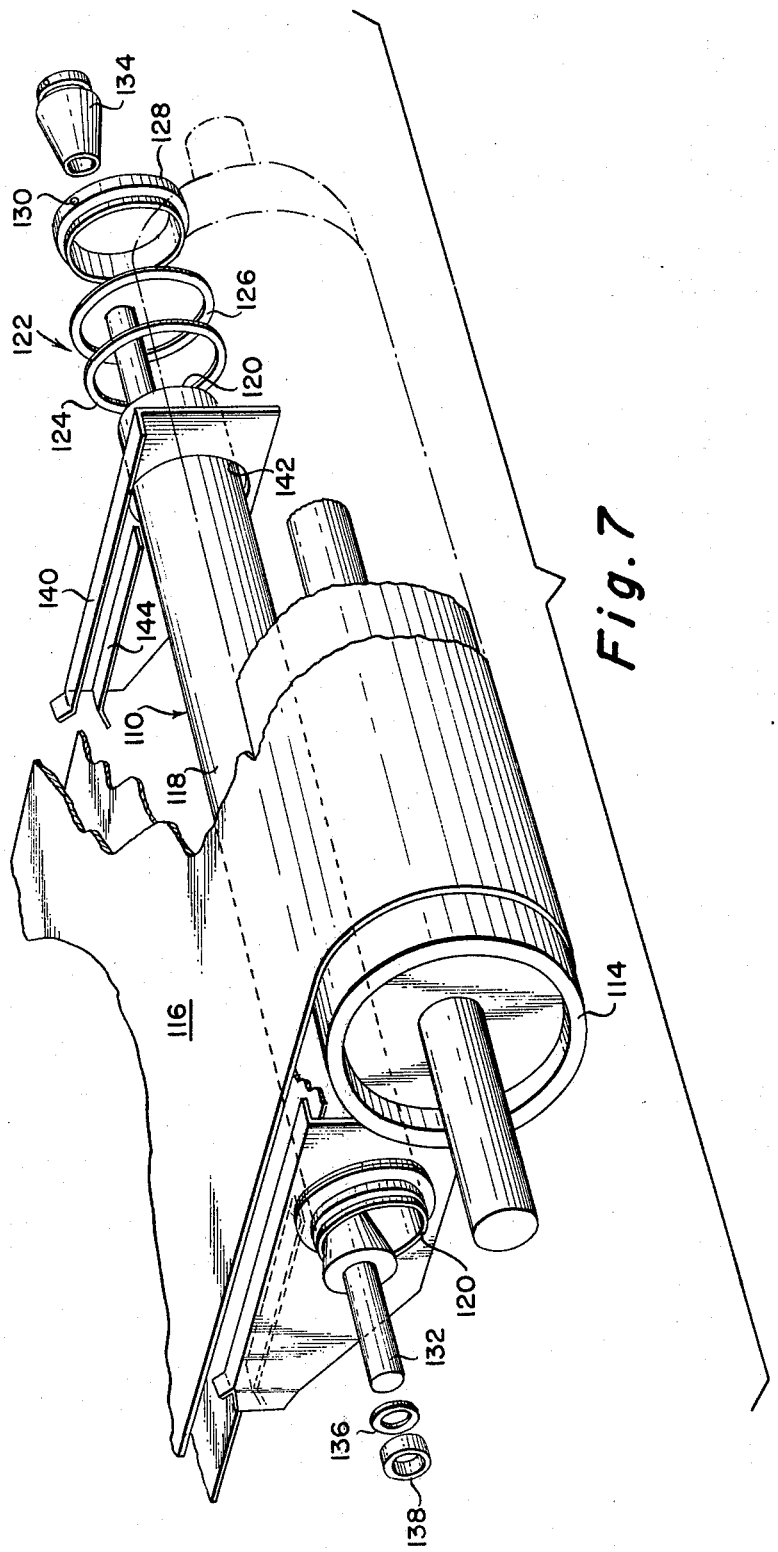
FIG. 7 is a perspective view of another embodiment of the aligner device of this invention.
Figure 8:
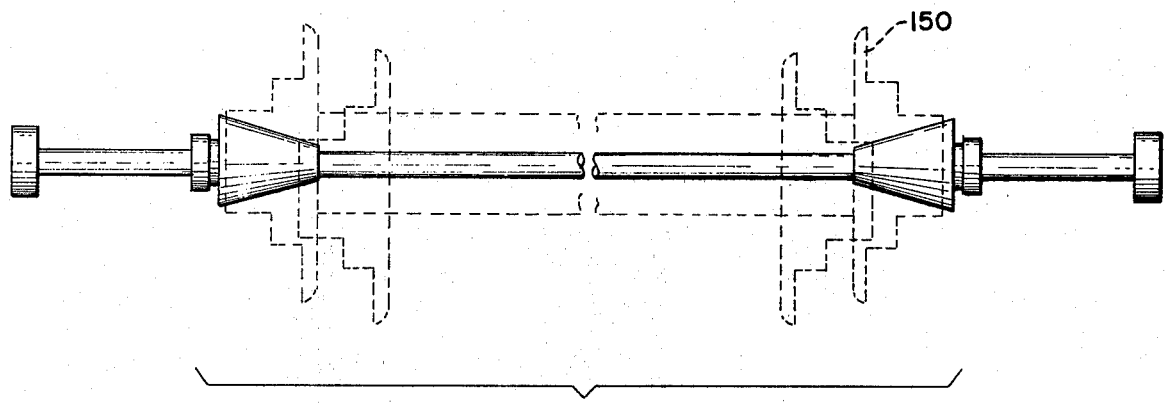
FIG. 8 is a view in elevation of the embodiment of FIG. 7 illustrating the tilted position of the idler roll.
Figure 9:
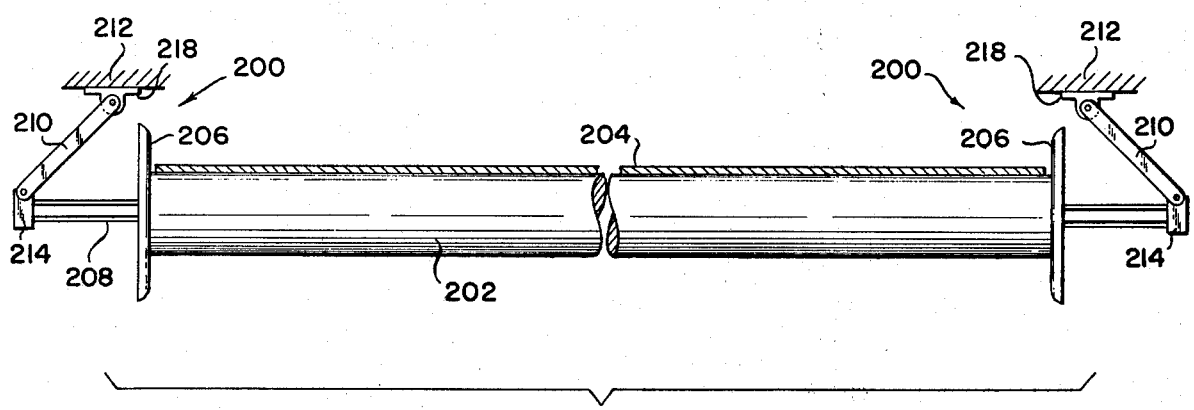
FIG. 9 is a view in elevation of another embodiment of the web aligner of this invention.

Another embodiment of the aligner of this invention employing the tilting principle for realigning a misaligned web is illustrated in FIGS. 7 and 8. The aligner device is generally indicated by the numeral 110 and is located in close parallel proximity to the head pulley or roll 114. Web 116 is played over the aligner device 110 and around the head roll 114 and moves in the direction indicated by the arrow. The aligner device 110 comprises a hollow, elongated idler or guide roll 118 which extends in a direction transverse of the direction of movement of the weg. The roll 118 has opposite open ends defined by annular edge portion 120. A thrust bearing assembly generally indicated by the numeral 122 is disposed on each end of the roll 118 and includes a set of thrust bearings 124, a bearing race 126 and a retaining collar 128 which is affixed to the end of the roller by means of a set screw 130.

The roll 118 is supported on an elongated shaft 132 which extends beyond the opposite ends of the roll. Conical supporting elements 134 are affixed to each end of the shaft 132 by means of a washer 136 and locking collar 138, the latter being affixed to the shaft by means of set screws 140. The conical elements 134 are rotatable on the shafts 132 and may be provided with suitable internally disposed bearing means not shown. The narrow ends of the conical elements 134 are directed inwardly toward the center of the shaft 132 to present outwardly inclined surfaces to each end of the idler roll 118. The peripheral edge portions 120 on each end of the idler roll rest on the inclined surfaces presented by the conical elements 134.

Elongated plates 140 are provided on each end of the guide roll 118. The plates are each provided with an aperture 142 through which the roll 118 is passed. The plates 140 are disposed between the bearing assemblies 122 and the outer edge portions of the web 116. A trackway 144 is provided on the inner surface of the plate 140 for the purpose of receiving the edge portion of the web 116.

In operation, when the web is in a predetermined centered position, the edge portions 120 of the roll 118 will be resting on the inclined surfaces of the opposed conical elements 134 approximately midway of the length of the inclined surfaces. If the web shifts laterally from the predetercenter position, it engages one of the end plates 140 which in turn engages the thrust bearing assembly 122. Continued movement of the web laterally will cause the idler roll to shift in a direction of movement, through the engagement of the web with the guide plate 140, and the guide plate, in turn, engages the bearing assembly 122. Assuming the lateral movement to be to the right of the drawing as viewed in FIG. 7, the right hand end of the idler roll will be caused to move up the inclined surface of the supporting conical element while the other end will move down the inclined surface of its supporting conical element. Accordingly, the roll is caused to tilt about a generally central transverse axis which in turn will urge the web and the roll to slide back toward the predetermined center position.

The operation of this embodiment is perhaps better understood with reference to the illustration in FIG. 8. In this figure, the bearing means 122 and the guide plate 144 are replaced by an annular flange 150 which is engaged by the side edge portions of the web upon the latter becoming laterally misaligned; however, the operation otherwise is substantially identical to the FIG. 7 embodiment. The purpose in using the elongated end plate 140 is to provide a greater surface area for engagement by the flexible web. This is quite important if the web is of a relatively lightweight material and relatively little stiffness. A greater surface area is required to create a greater force to effect a lateral movement of the roll 118.

Figure 10:
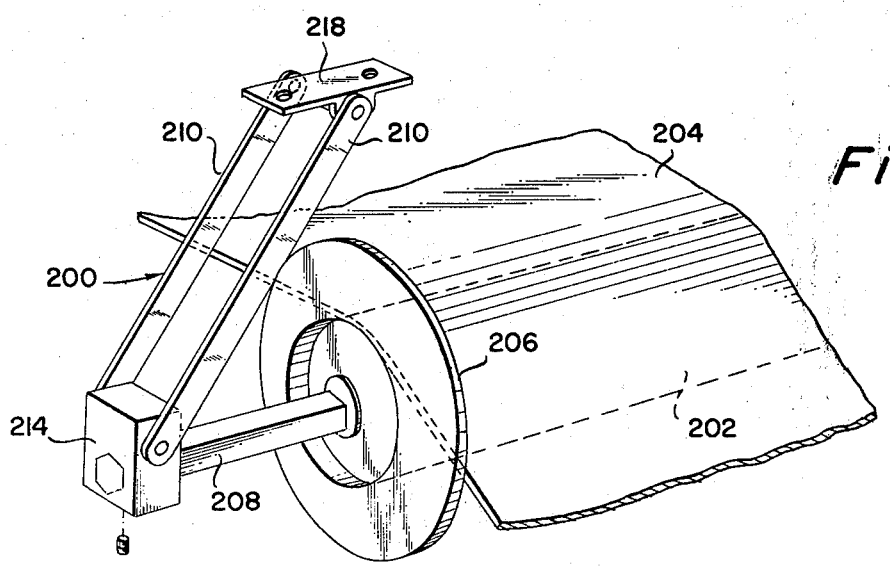
FIG. 10 is a perspective view illustrating one end of the aligner of FIG. 9.

Another embodiment is shown in FIGS. 10 and 11 and includes a hanger assembly arrangement generally indicated by the numeral 200. The idler roll 202 supports belt 204 and includes flanges 206 which are engaged by the side edges of the web when the latter shifts laterally. The roll 202 is journaled through suitable bearing means on shaft 208 with the latter being supported at its opposite ends by the hanger assemblies 200. The hanger assemblies include pivoted links 210 which are pivoted at one end to a static support element 212 and at the other end to a respective end of the shaft 208 by means of hanger block 214. The links are pivoted at their upper ends to a mounting bracket 218 which in turn is affixed to the static supporting surface 212. The important feature of this embodiment is that the links extend downwardly at an angle relative to the vertical plane, but in opposite directions. Accordingly, when the belt causes the idler roll 202 to shift to the right, the link 210 will be caused to pivot to the right, shortening the effective distance between the shaft end and the satic support means. On the other hand, the link 210 on the left hand side will be caused to pivot also in a counterclockwise direction but it will have the effect of lengthening the distance between the static support means 212 and the respective shaft end. Accordingly, the roll 202 will be caused to tilt in a counterclockwise direction whereupon the web and roll will be urged back to the predetermined centered position.

A still further embodiment will be illustrated in FIGS. 12 and 13 and includes an idler roll 240 having flanges 242 on each end thereof and receiving a web or conveyor belt 244. The roll 240 is suitably journaled on a shaft 246 which in turn is supported by outwardly inclined ramp members 248. The opposite ends of the shaft 246 are provided with a pair of wheels 250 which are journaled in a wheel block 252 which is affixed to each outer end of the shaft 246. Each of the ramps 248 are provided with a pair of tracks 254 for receiving the wheels 250. The ramps are affixed to suitable static support means. As is now apparent from the discussion of the operation of the foregoing embodiment, when the web 244 becomes misaligned and causes the roll 240 to shift to the right, for example, the wheels 250 on the right hand end will move up the inclined ramp and the wheels on the opposite side will move down its respective ramp; therefore, the roll will be caused to pivot in a counterclockwise direction. The web will then seek to return to the predetermined center position.

In a general manner, while there has been disclosed effective and efficient embodiments of the invention, it should be well understood that the invention is not limited to such embodiments as there might be changes made in the arrangement, disposition, and form of the parts without departing from the principle of the present invention as comprehended within the scope of the accompanying claims.

I claim:

1. A web aligning device for a continuously moving web comprising a framework adjacent to said web,
a guide roll receiving said web,
end plates on said roll the distance between said end plates being approximately the width of said web,
a shaft, said roll being mounted on said shaft for rotatable and lateral movement relative thereto,
a pair of lifters affixed to said framework and rotatably supporting said shaft on each end thereof,
said lifters each comprising a support adjacent said web, a ramp on said support and pivoted about a horizontal axis intermediate its length, said ramp having a lower end portion and an upper end portion on opposite sides of said axis, a shaft end supporting means on said lower end portion, sensing means engaging an adjacent end plate of said roll for sensing lateral movement thereof, actuating means connected to said sensing means and engaging the upper portion of said ramp, whereby lateral movement of said roll is sensed by said sensing means and said actuating means is caused to pivot said ramp to raise and lower said lower portion and the end of the shaft supported thereon,
said lifters being responsive to lateral movement of said web and said roll from a predetermined center position to cause the lowering of one end of said roll and the lifting of the other to cause said roll and said web to slide back to said predetermined centered position.

2. The device of claim 1 and including spring tensioning means connected to said ramp and biasing said pivoted ramp in a direction tending to lift said shaft end.

3. The device of claim 2 and including means for adjusting the tension on said spring.

4. The device of claim 1 and including main pulleys about which said web is disposed, said guide roll being disposed in close parallel proximity to and immediately preceding one of said pulleys.

5. A web aligning device for a continuously moving web comprising, a guide roll disposed transversely to the direction of movement of said web, said web played over and supported by said roll, support means rotatably supporting said roll and permitting relative lateral movement, said support means comprising a pair of horizontally disposed conical elements, one for each end of said roll, means supporting said conical elements, means on each end of said roll for receiving said conical elements, said conical elements extending partially inwardly of said means for receiving said conical element and presenting oppositely inclined supporting surfaces for the ends of said rolls,
said roll being laterally movable on said surfaces in response to lateral movement of said web from a predetermined centered and aligned position wherein said roll is generally horizontally disposed, said lateral movement of said roll on said oppositely inclined surfaces resulting in the lowering of one end of said roll and the raising of the other, whereby said roll and web are urged to slide back to said predetermined centered position.

6. The device of claim 5 wherein said web is disposed around main pulleys and said roll is disposed in close parallel proximity to and immediately preceding one of said main pulleys.

7. The device of claim 5 and including flange means on said roll for engaging the side edge portions of said webs, and for causing said roll to shift laterally when said web shifts laterally and engaged one of said flanges.

8. The device of claim 5 wherein said conical elements are rotatably mounted.

9. The device of claim 8 wherein said roll is hollow and has open ends and said support means for said conical elements comprises a shaft extending through said roll in the axial direction, and extending beyond the open ends of said roll, means for mounting said conical elements on said shaft and means for supporting the shaft ends.

10. The device of claim 5 wherein said flange means comprises an annular end plate affixed to each end of said roll.

11. The device of claim 10 and including auxiliary flange means comprising a pair of elongated plates disposed in a vertical plane and mounted on each end of said roll and inwardly of said annular end plates, said roll being rotatable relative to said elongated plates, the edge portions of said web engaging said elongated plates upon lateral shifting of said web whereby said roll is caused to shift laterally.

12. The device of claim 11 and including thrust bearing means disposed between said annular plates and said elongated plates.

13. A web aligning device for a continuously moving web comprising a guide roll disposed transversely to the direction of movement of said web, said web played over and partially supported by said roll, flange means on each end of said roll, shaft means rotatably supporting said roll, static support means, suspension means supporting said shaft from said static support means, said suspension means comprising a pair of pivoted links, one for each end of said shaft, extending between said static support means and the ends of said shaft, said links extending downwardly from said static support means in opposite angular directions relative to the vertical plane, whereby when said web shifts laterally from a predetermined centered position, it engages one of said flanges and urges said roll in a lateral direction causing the latter to raise upwardly at one end and move downwardly at the other.

14. A web aligning device for a continuously moving web comprising a framework adjacent to said web,
a guide roll for receiving said web,
end plates on said roll, the distance between said end plates being approximately the width of said web,
a shaft supporting said roll for rotatable and lateral movement,
a pair of lifters affixed to said framework and supporting said roll supporting shaft on each end thereof,
said lifters comprising inclined ramps on said framework adjacent each end of said shaft, at least one wheel mounted on each end of said shaft, trackway means in each of said ramps for receiving said wheels, said roll being movable laterally in response to a misalignment of said web whereby said wheels move up and down said ramps to cause the raising and lowering of said shaft ends to cause said roll to seek a central position.

* * * * *